United States Patent
Duong et al.

(10) Patent No.: US 7,298,326 B2
(45) Date of Patent: Nov. 20, 2007

(54) PORTABLE DEVICE AND METHOD EMPLOYING BEAM SELECTION TO OBTAIN SATELLITE NETWORK POSITIONING SIGNALS

(76) Inventors: Minh H. Duong, 29737 N. Environ Cir., Lake Bluff, IL (US) 60044; Alan Boorom, 213 N. Ridgemoor Ave., Mundelein, IL (US) 60060; Yiu K. Chan, 432 E. Pine Lake Cir., Vernon Hills, IL (US) 60061

( * ) Notice: Subject to any disclaimer, the term of this patent is extended or adjusted under 35 U.S.C. 154(b) by 318 days.

(21) Appl. No.: 10/812,669

(22) Filed: Mar. 30, 2004

(65) Prior Publication Data

US 2007/0188380 A1    Aug. 16, 2007

(51) Int. Cl.
*H01Q 3/12* (2006.01)
(52) U.S. Cl. ........... 342/374; 342/357.15; 342/419
(58) Field of Classification Search ........... 342/357.15, 342/372, 374, 419; 455/269, 277.1, 276.1
See application file for complete search history.

(56) References Cited

U.S. PATENT DOCUMENTS

| | | | | |
|---|---|---|---|---|
| 4,881,078 A | * | 11/1989 | Yamane et al. | 342/155 |
| 5,041,835 A | * | 8/1991 | Matsumoto | 342/374 |
| 5,089,824 A | * | 2/1992 | Uematsu et al. | 342/359 |
| 5,457,465 A | * | 10/1995 | Collier et al. | 342/374 |
| 5,559,806 A | * | 9/1996 | Kurby et al. | 370/325 |
| 5,649,306 A | | 7/1997 | Vannatta et al. | |
| 6,456,257 B1 | * | 9/2002 | Zamat | 343/876 |
| 6,563,458 B2 | | 5/2003 | Aizawa et al. | |
| 6,968,022 B1 | * | 11/2005 | Poor et al. | 375/346 |
| 2001/0018327 A1 | * | 8/2001 | Houston et al. | 455/13.2 |
| 2002/0080067 A1 | * | 6/2002 | Zamat | 342/374 |
| 2002/0090969 A1 | * | 7/2002 | Tse et al. | 455/550 |
| 2003/0112180 A1 | * | 6/2003 | Wight | 342/374 |
| 2004/0080468 A1 | * | 4/2004 | Wakefield | 345/55 |
| 2005/0093743 A1 | * | 5/2005 | Park et al. | 342/359 |
| 2005/0122262 A1 | * | 6/2005 | Ahn | 342/359 |

FOREIGN PATENT DOCUMENTS

| | | |
|---|---|---|
| EP | 0455943 | 8/1996 |
| EP | 1148584 | 10/2001 |
| EP | 1445826 | 8/2004 |
| WO | WO 02/097469 A1 | 12/2002 |
| WO | WO 03/071713 A1 | 8/2003 |

OTHER PUBLICATIONS

International Search Report dated Jun. 29, 2005 for International Application No. PCT/US2005/008344, pp. 1-3.

* cited by examiner

*Primary Examiner*—Dao Phan

(57) ABSTRACT

A portable device, such as a handheld device (10), laptop device or other suitable portable device, employs an antenna beam selection structure that is coupled to a plurality of built-in antennas (12 and 14) of the portable device that have different beam angles with respect to each other. The plurality of built-in antennas are coupled to a satellite network positioning signal processing circuit (18) so that device positioning signals from a satellite network can be received and processed by the device. The plurality of built in antennas may be stationary or movable with respect to each other. A control circuit (20) is operative to control switching between each of the plurality of built in antennas based on detected signal strength, signal quality measurements, the number of positioning satellites detected by a satellite network positioning signal processing circuit or other suitable criteria.

20 Claims, 5 Drawing Sheets

PORTABLE DEVICE AND METHOD EMPLOYING BEAM SELECTION TO OBTAIN SATELLITE NETWORK POSITIONING SIGNALS

FIELD OF THE INVENTION

The invention relates generally to wireless communication devices and methods that employ position signal detection such as GPS receiver systems and more particularly to portable devices that include satellite network positioning processing circuits and multiple antennas.

BACKGROUND OF THE INVENTION

Portable devices are known which employ global positioning system (GPS) based position information such as handheld telephones, personal digital assistants, internet appliances, and other portable devices. Such devices typically employ multi-band wireless communication to allow the device not only to receive GPS information, but also communicate via one or more other wireless communication networks such as wireless cellular networks, short range wireless networks, and other networks. It has become increasingly important to be able to accurately locate the device for emergency purposes in the event the user of the device needs emergency assistance. However, satellite network based positioning signal systems are line-of-sight systems and therefore GPS antenna performance degradation can occur due to a user's physical interactions with the handheld device in such ways that can block or significantly degrade the GPS antenna performance (e.g. holding a device sideways).

Global positioning system receivers may be formed integrally with personal computers, portable telephones and other devices. Such devices include GPS signal processing circuits that decode received signals and carry out the arithmetic operation for calculating position information. Alternatively, a device may receive the GPS measurements and send them to an off-site element, such as a network element available in a wireless network which then carries out the arithmetic computations and sends back the latitude and longitude information to the device or other network element.

Some GPS reception systems have been proposed in which a device employs a built-in antenna and an external antenna and the receiving antenna is switched from the built-in antenna to an external antenna. Such an external antenna may be used when a sufficient reception level for positioning can not be obtained using only the built-in antenna. Such proposed devices typically require the use of an external removable antenna which require a user to carry an antenna with them and plug it into the housing when desired.

In addition, in order to choose the appropriate antenna, the system specifies a number of GPS satellites from which to take measurements and then from the extracted specified number of satellites, the antenna switching control unit designates the antenna with the high reception levels detected from the fixed number of satellites. However, such devices may not maximize the GPS position resolution capabilities of the device since the antenna with the strongest signals is typically chosen regardless of whether an antenna can be used to detect more satellites than the other antenna.

DETAILED DESCRIPTIONS OF THE DRAWINGS

The present invention is illustrated, by way of example and not limitation, in the accompanying figures, in which like reference numerals indicate similar elements, and in which.

DETAILED DESCRIPTION OF THE PREFERRED EMBODIMENT

Figure 1:
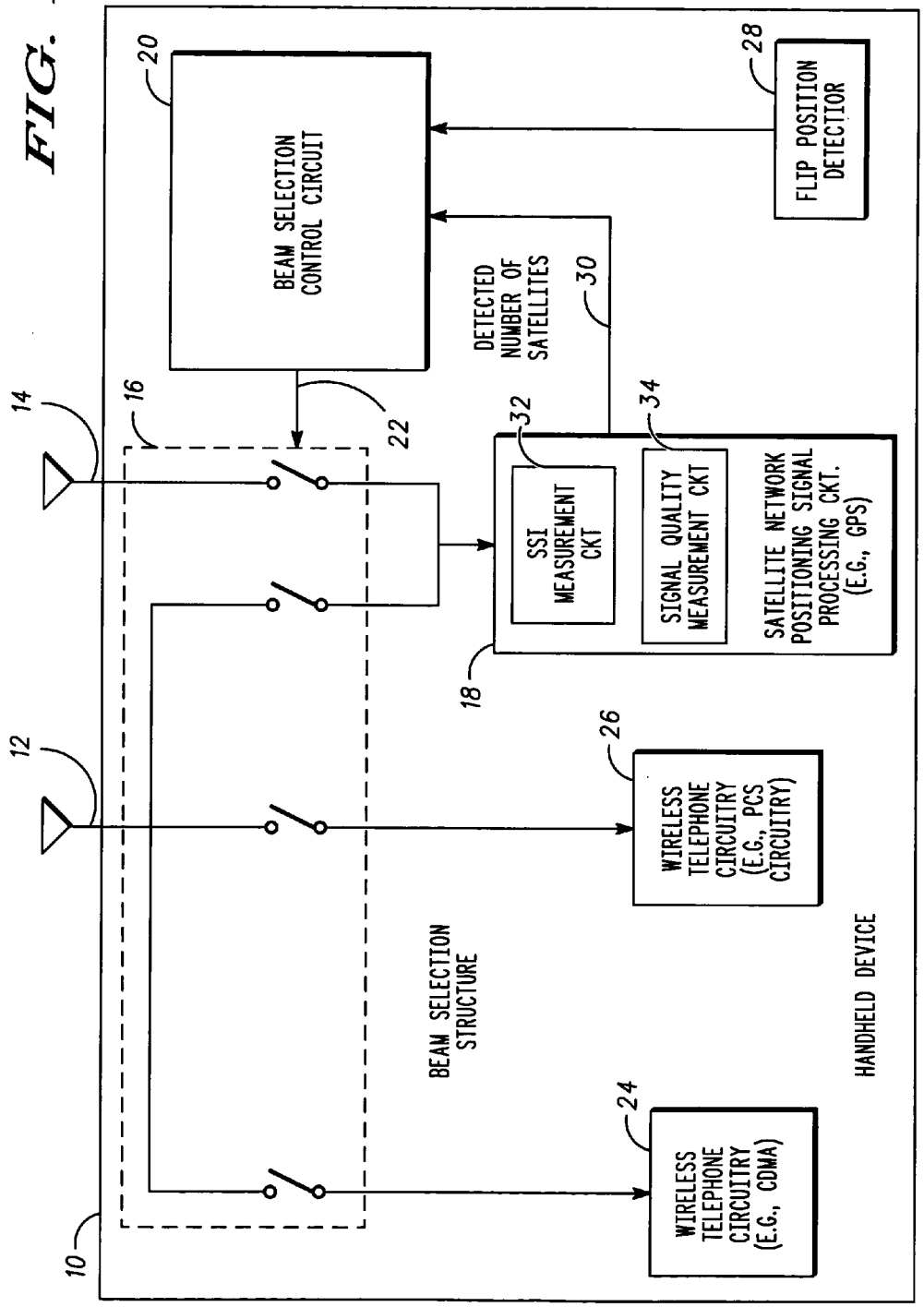
FIG. 1 is a functional block diagram representing one example of a handheld device employing a satellite network positioning signal (e.g. GPS signals) based, beam selection control system in accordance with one embodiment of the invention.

Briefly, a portable device, such as a handheld device, laptop device or other suitable portable device, employs an antenna beam selection structure that is coupled to a plurality of built-in antennas of the portable device that have different beam angles with respect to each other. The plurality of built-in antennas are coupled to a satellite network positioning signal processing circuit so that device positioning signals from a satellite network can be received and processed. The plurality of built in antennas may be stationary or movable with respect to each other. When movable, a more orthogonal beam angle with respect to each antenna may be possible.

A control circuit is operative to control switching between each of the plurality of antennas based on detected signal strength, signal quality measurements, the number of positioning satellites detected by a satellite network positioning signal processing circuit or other suitable criteria. As such, one of the many advantages of the invention includes selecting a better of two or more built-in antennas to provide enhanced detection of satellite based positioning signals using beam angles of different built-in antennas. Also, if desired, the selection of a built in antenna can be used for obtaining device location information, based on a desired number of satellites detected instead of, for example, only the antenna that detects the strongest signals. Selecting the antenna that detects more satellites can provide more data from which to triangulate when determining the device's position. Other advantages will be apparent to those skilled in the art.

In addition, the satellite network positioning signal processing circuit may also include signal strength measurement circuitry and signal quality measurement circuitry to further determine which received signals are more desirable for use in determining device location and antenna use. The beam selection structure is operative to change a beam angle of the handheld device with respect to a nominal device position by selecting between a plurality of built in antennas that are used to detect satellite network positioning signals. Each of the plurality of antennas provides a different beam angle with respect to a nominal position of the handheld device. The beam selection structure may be an active switch structure or a passive switching structure as desired.

In one embodiment, the portable device may be a flip type device, such as a cell phone, personal digital assistant (PDA), portable computer or any other suitable portable device; having a base and a flip portion. In one embodiment, a flip position detector is used by a control circuit to select one of the plurality of built in antennas based on the flip position detector detecting that the handheld device is open or closed. An antenna is in the flip portion and another built in antenna is in the base portion to provide a suitable beam angle difference. These antennas are movable with respect to each other. In another embodiment, the portable device may be a candybar or stick configuration with no flip design wherein the antennas are affixed to provide different beam angles. With a non-flip style design, the antennas may also be configured to slideout, rotate or otherwise be movable with respect to each other if desired.

FIG. 1 is a block diagram illustrating one example of a wireless handheld device 10 that includes a plurality of built in antennas 12 and 14 each of which has a different beam angle with respect to one another. They are built in because they are not designed to be readily removable (e.g., not connected as quick disconnect structures) and because they include a surface or other portion that is coupled with (e.g., within, onto etc.) a housing portion of the device. Although for convenience and by way of example only the invention will be described with reference to a handheld device, it will be recognized that the invention is applicable to any suitable non-handheld devices, such as but not limited to, portable devices such as laptop devices. The wireless handheld device 10 includes a beam selection structure 16, a satellite network positioning signal processing circuit 18, such as a GPS receiver or other suitable device positioning determining circuit, that receives satellite transmitted device positioning signals received by the antennas 12 and 14. A control circuit 20 is operatively coupled to the beam selection structure 12 to provide a beam select signal 22 for the beam selection structure 16 to facilitate selection of any one of the plurality of antennas 12 and 14. The control circuit 20 controls the beam selection structure 18 to acquire device position location information from the positioning satellites using a built in antenna that is determined to receive positioning information from a higher number of positioning satellites, or receives higher strength signals or higher quality signals or any suitable combination thereof or any other suitable antenna selection criteria as determined for example by the satellite network positioning signal processing circuit 18. Hence, the satellite network positioning signal processing circuit 18 selectively receives satellite positioning information from the plurality of built in antennas.

If desired, the wireless handheld device may also include wireless telephone circuitry 24 and 26 which is operatively coupled to receive signals from, for example, one of the antennas such as antenna 12. By way of example only, and for purposes of discussion, the wireless handheld device 10 will be described as a wireless cellular telephone and includes other functionality not shown as known in the art. For example, the wireless handheld device 10 may be a dual band trimode device that, for example, has code division multiple access (CDMA) wireless telephone circuitry and other wireless telephone circuitry for multiband operation and also includes the satellite network positioning signal processing circuit 18 for the trimode operation. It will be recognized, however, that the wireless handheld device may be any suitable handheld device as desired. The satellite network positioning signal processing circuit 18 and beam selection control circuit 20 may be implemented in any suitable manner such as, for example, by one or more suitably programmed processing devices such as a DSP, microprocessor, microcomputer, state machines, and discrete logic, if desired, or any suitable combination of hardware, software and firmware.

The plurality of antennas 12 and 14 are selectable and have different beam angles, that in one example, may be orthogonal to one another. However, any suitable different beam angle may also be used.

Where the wireless handheld device 10 is a flip style cell phone (see FIGS. 4 & 5) it may have a flip position detector 28 which may be, for example, a physical or electronic switch that detects whether the flip phone is in an open or closed position. In this particular embodiment, one of the antennas, such as antenna 12 may be, for example, an antenna located in the movable flip portion of the phone whereas the other antenna 14 may be a stub antenna or hidden antenna located in the base of the phone or in any other suitable location. In addition, the antenna 14 in FIG. 1 is shown such that the beam selection structure 16 has been selected to allow signal from antenna 14 to be received by the satellite network positioning signal processing circuit 18.

The satellite network positioning signal processing circuit 18 receives a signal from at least one of the plurality of antennas and determines a number of positioning satellites that are detected using that antenna and outputs, for example, data 30 representing a number of detected satellites for use by the beam selection control circuit 20. If desired, the satellite network position signaling processing circuit may also include signal strength indication measurement circuitry 32 and/or signal quality measurement circuitry 34. The signal strength measurement circuitry may, as known in the art, determine the signal strength of one or more received signals. Similarly, the signal quality measurement circuit 34, as known in the art may determine the signal quality such as frame error rates or any other suitable criteria. The beam selection control circuit 20 is responsive to the data 30 representing the detected number of satellites that are detected by a given antenna and controls searching between the plurality of antennas based on the number of positioning satellites detected. It will be recognized that the functions of the control circuit 20 and satellite network positioning signal processing circuit 18 may be combined and employed in any suitable structure.

Figure 2:
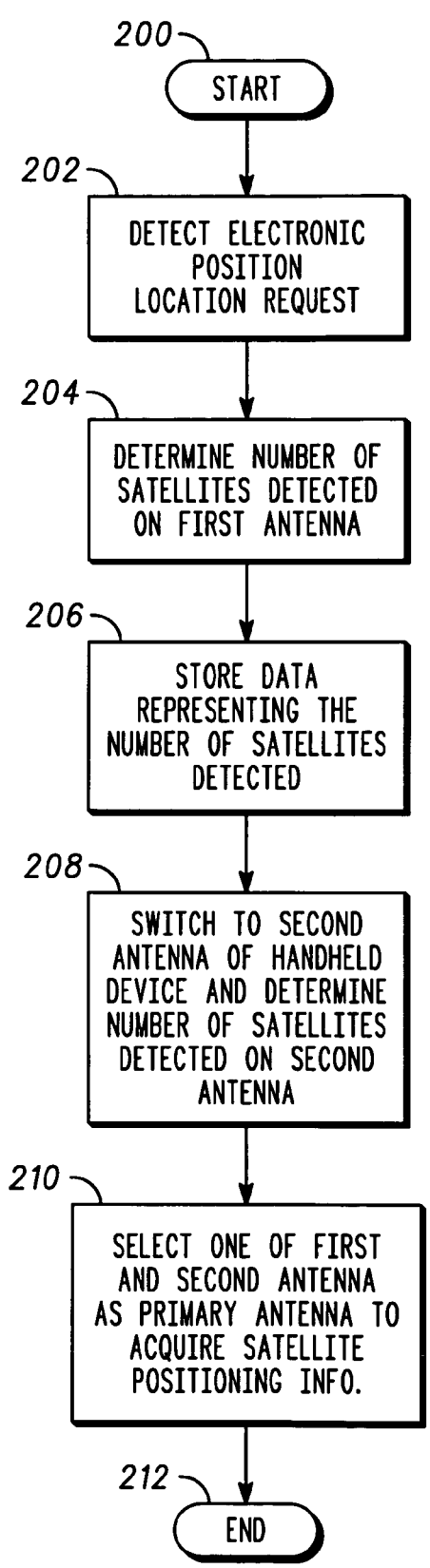
FIG. 2 is a flow chart illustrating one example of a method for acquiring satellite positioning information for a handheld device in accordance with one embodiment of the invention.

FIG. 2 illustrates one example of a method of acquiring satellite positioning information for a handheld device that may, for example, be carried out by the handheld device 10 or any other suitable device or devices. As shown in block 200, the method starts by one of the antennas 12 and 14 being selected or if in a default setting, being connected to the satellite network positioning circuit processing circuit 18. As shown in block 202, the method includes detecting an electronic position location request such as an e-911 request signal that may be activated for example through the cellular network or through a suitable user interface. The user interface as known in the art may be a voice interface, keypad, touchscreen or any other suitable interface used to initiate the position of the handheld device from a GPS system or other suitable satellite network positioning system. As shown in block 204, the method includes determining, such as by the satellite network positioning signal processing circuit 18, a number of satellites detected on a first antenna. For example, the beam selection control circuit 20 connects a first antenna by controlling the beam selection structure 16 to select the desired antenna. The number of different satellites received by that antenna are detected and recorded by the satellite network positioning signal circuit 18. As such, as shown in box 206, the satellite network positioning signal processing circuit 18 for example, stores the detected number of satellites in memory for that particular antenna which may then be compared, such as by the beam selection control circuit or any other suitable circuit, to a threshold number of satellites that are desired to be detected.

As shown in block 208, the method includes switching to a second antenna of the handheld device, such as by the beam selection control circuit 20 sending the beam selection signal 22 to the beam selection structure 16, and determining a number of satellites detected on the other antenna. The detected number of satellites detected on the second antenna may also be stored in memory. As shown in block 210, the method includes selecting one of the first and second antennas, such as by the beam selection control circuit 20, as a primary antenna to acquire satellite positioning information. This is done based on the determined number of satellites detected on each of the first and second antennas such that the antenna that detected the largest number of satellites is selected as the antenna for actually acquiring satellite positioning information necessary to locate the handheld device. Hence the method includes acquiring device position location information from the positioning satellites using the antenna that is determined to receive positioning information from a higher number of positioning satellites. The process then ends as shown in block 212 by waiting for another global positioning requirement event occurs.

The beam selection control circuit 20 may set a satellite number threshold and a user may set such a threshold through a suitable user interface such that if the threshold number of satellites are not detected for a given antenna then that antenna is not chosen as the antenna to acquire satellite positioning information. As such, the method may include avoiding a switch to a second antenna when the stored number of satellites detected from the first antenna compares favorably with a satellite number threshold, such as meeting or exceeding a minimum threshold.

The antenna that detects the higher number of positioning satellites will be the antenna selected to acquire the actual position information. Accordingly, even if, for example, a measurement from a given satellite has a higher signal quality level, but the total number of satellites detected from that antenna is less than the number detected on the other antenna, the wireless handheld device will select the antenna having the higher number of satellites detected to provide a larger number of satellites for triangulation and may result in a more accurate location compared to other techniques. In addition, the beam angle is changed through beam selection so that, for example, when a user of a wireless handheld device is lying down or otherwise holding the handheld wireless device at a position that can deprecate GPS signals, the other antenna may be selected in an attempt to obtain a better performance advantage over the other antenna.

In an alternative embodiment, signal strength measurements and/or signal quality measurements may also be incorporated instead of or in addition to the detected number of satellites to indicate which antenna may be more desirable for selection. For example, where both antennas detect the same number of satellites, it may be desirable to evaluate the signal strengths detected from each of the various satellites on a given antenna and select an antenna having a higher average of signal quality over a specified number of satellites.

Where the number of satellites detected is not used as the basis for which antenna to select, a method of acquiring satellite positioning information for a portable device includes determining, using a first antenna of a plurality of built in antennas that have different beam angles a signal strength of satellite positioning signals received by the first antenna. The method also includes switching to a second built in antenna having a different beam angle from the first antenna and determining a signal strength of satellite positioning signals received by the second antenna; and acquiring device positioning signals from the positioning satellites using the built in antenna that is determined to receive higher signal strength device positioning signals from the positioning satellites.

Figure 3:
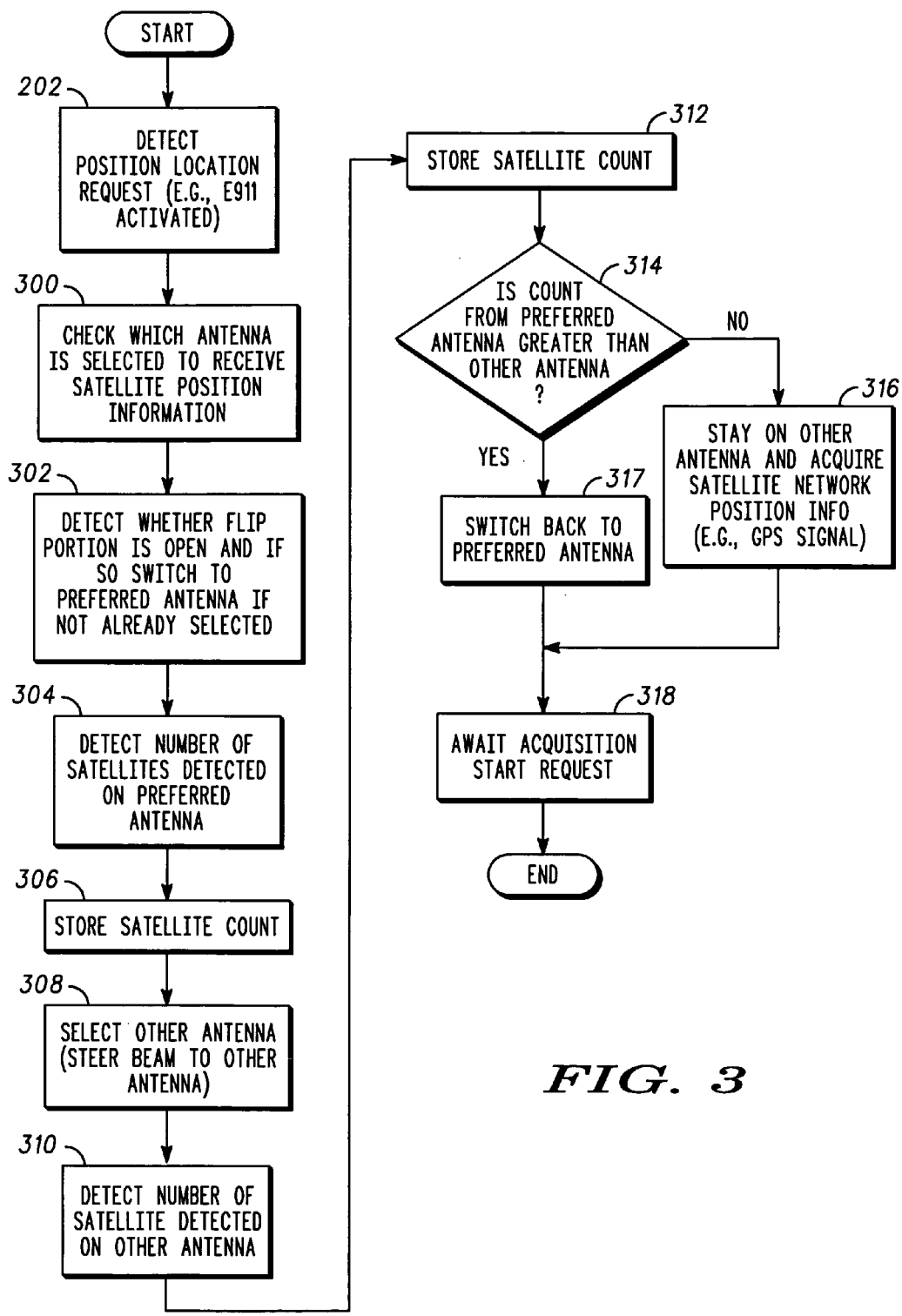
FIG. 3 is a flow chart illustrating another example of a method for acquiring satellite positioning information for a handheld a device in accordance with one embodiment of the invention.
Figure 4:
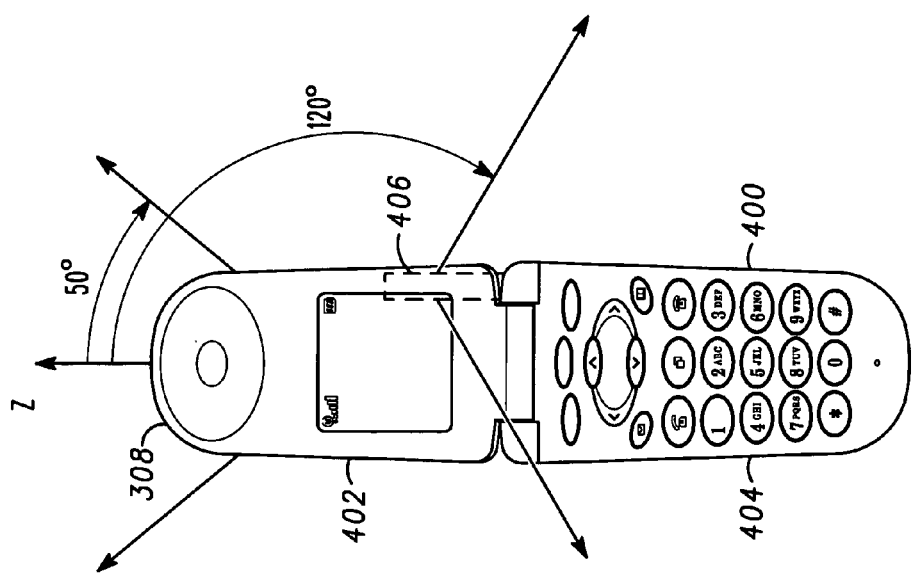
FIG. 4 is a perspective view of a flip style handheld device having a plurality of antennas in accordance with one embodiment of the invention.

Referring to FIGS. 3 and 4, a method of acquiring satellite positioning information for a flip style handheld device is shown. The flip style handheld device 400 includes a flip portion 402 and a base portion 404 wherein the base portion, as known in the art, may include various buttons and interfaces to facilitate communication. The flip portion 402 may have therein an antenna and the base portion 404 may, for example, have a stub antenna 406. The beam angles of the two antennas are preferably orthogonal or may have any suitable beam angle difference. In this example, the flip portion antenna 408 has a 50 degree beam angle and the stub antenna has a 120 degree beam angle. The method includes detecting the electronic position location request as previously noted with the respect to FIG. 2. As shown in block 300 the method includes determining which antenna is selected to receive the satellite positioning information. As shown in block 302 the method includes detecting whether the flip portion 402 is open and if it is open, the method includes switching to the preferred antenna if the preferred antenna is not already selected. For example, when the phone is open, a preferred antenna may be the flip antenna whereas when the phone is closed, the preferred antenna for GPS acquisition may be the stub antenna 406.

As shown in block 304, the method includes detecting the number of satellites on the preferred antenna and as shown in box 306, the method also includes storing the detected satellite count. This includes storing any information that corresponds to the number of satellites detected such as a pointer to the actual number, the number itself or any information representing such information. This may be stored, for example, in any suitable memory as noted above and may be accessible by the beam selection control circuit 20 which may then compare the stored satellite count to a stored threshold value and to another satellite count detected by the other antenna to determine which antenna detected the higher number of satellites. As shown in block 308, the method includes selecting the other antenna to detect the number of satellites. This is also shown in block 310. As shown in block 312, the method includes storing the satellite count from the other antenna. As shown in block 314, the method includes determining if the count from the preferred antenna is greater than the count from other antenna, if not, the beam selection control circuit does not switch the antenna, but instead, the system stays on the current antenna and acquires the requisite satellite network position information. As shown in block 318, the device then awaits for another GPS acquisition start request.

Referring back to block 314, if the satellite count detected from the preferred antenna is greater than the other antenna, the method includes switching back to the preferred antenna as shown in block 316 and acquiring the satellite position information using the preferred antenna. As such, the flip portion includes an antenna therein that is movable with respect to the other antenna and the method includes selecting one of the first and second antennas as a preferred antenna based on the detected position of the movable antenna. This helps facilitate rapid detection of satellite positioning information since when the phone is flipped open and hence turned on, the preferred antenna can be used to begin acquisition of the GPS signal immediately.

Figure 5:
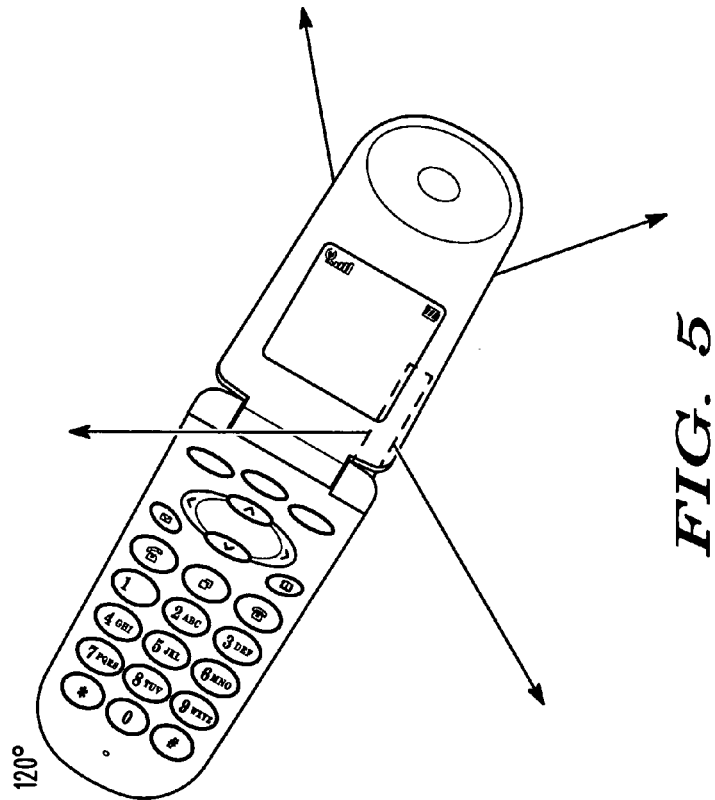
FIG. 5 is a perspective view of a flip style handheld device having a plurality of antennas in accordance with one embodiment of the invention.

FIG. 5 graphically illustrates the handheld device 400 being held, for example, by a user that may be lying down. As shown, some of the beam angle from the stub antenna is pointing upward whereas the flip antenna has nearly all of its beam angle pointing down or towards the horizon therefore the stub antenna has a slight performance advantage over the other antenna and as such may be the suitable antenna for selection.

Figure 6:
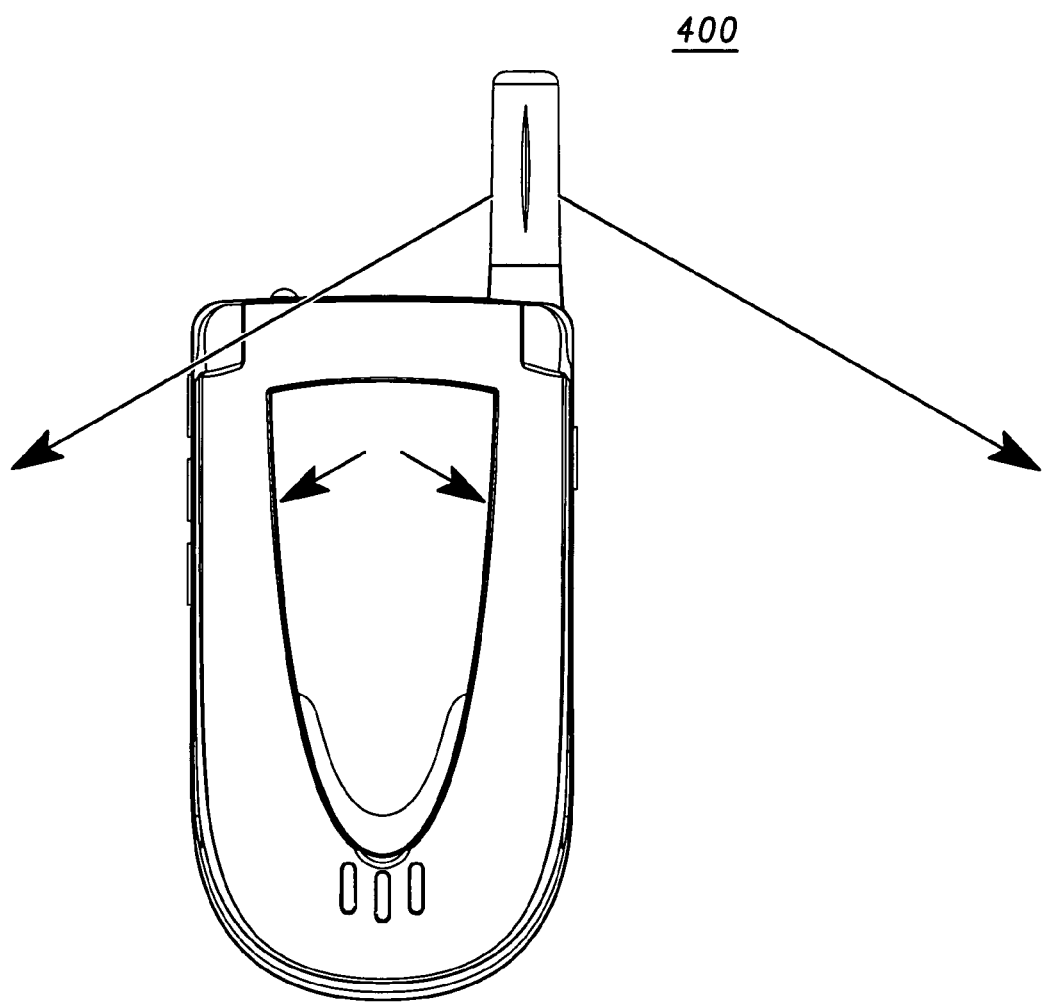
FIG. 6 is a perspective view of a closed flip style handheld device having a plurality of antennas in accordance with one embodiment of the invention.

FIG. 6 graphically illustrates the handheld device 400 being in a closed position (e.g., in an idle mode). As shown, the performance of the antenna in the flip portion may be degraded with a lower magnitude being shown by the shorter arrows. The stub antenna has a slight performance advantage over the other antenna and as such may be the suitable antenna for selection in an idle mode. Upon opening of the device, the antenna in the flip portion moves with respect to the stub antenna and may serve as a better antenna to receive satellite position signals. In other words, the antenna orientations change with respect to each other. Although the device is relatively small in this example, an improved beam angle diversity is provided using a movable antenna configuration.

The above-described apparatus and method can provide a beam selection structure that is operative to change a beam angle of a handheld device with respect to a nominal device position. It can also detect the number of satellites that may be received on a given antenna (built in or non-built in) and choose the antenna with the more favorable number of satellites detected. When the device is rotated or held in a different position and a GPS measurement is required, the device automatically chooses the better antenna, such as the antenna that receives signals from the higher number of satellite signals or other based on other suitable criteria. It will be recognized that a satellite may not be determined to be detected unless it meets a certain minimum signal strength or signal quality level.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A wireless portable device comprising:
    a plurality of antennas operative to receive signals from a plurality of positioning satellites and wherein at least two of the plurality of antennas have different beam angles with respect to each other;
    a beam selection structure operatively coupled to the plurality of antennas; and
    a control circuit, operatively coupled to the beam selection structure, and operative to control switching between each of the plurality of antennas based on a number of positioning satellites detected through each of the antennas.

2. The wireless portable device of claim 1 including a satellite network position signal processing circuit operative to receive device positioning signals received by the plurality of antennas, determine a number of positioning satellites that are detected by a selected antenna and output information corresponding to a number of detected satellites.

3. The wireless portable device of claim 1 wherein the beam selection circuit is operative to change a beam angle of the portable device with respect to a nominal device position.

4. The wireless portable device of claim 2 wherein the satellite network position signal processing circuit further includes at least one of signal strength measurement circuitry and signal quality measurement circuitry.

5. The wireless portable device of claim 1 wherein the control circuit controls the beam selection structure to acquire device positioning signals from the positioning satellites using the antenna that is determined to receive positioning signals from a higher a number of positioning satellites.

6. A wireless portable device comprising:
    a flip position detector operatively coupled to detect whether the wireless portable device is in an open or closed position;
    a plurality of antennas operative to receive device positioning signals from a plurality of positioning satellites and wherein at least two of the plurality of antennas have different beam angles with respect to each other;
    a beam selection structure operatively coupled to the plurality of antennas and to the flip position detector;
    a satellite network position signal processing circuit operatively coupled to receive device positioning signals received by the plurality of antennas, determine a number of positioning satellites that are detected by a selected antenna and output information corresponding to a number of detected satellites; and
    a control circuit, operatively coupled to the antenna beam selection structure, and operative to control switching between each of the plurality of antennas based on the number of positioning satellites detected by the satellite network positioning signal processing circuit.

7. The wireless portable device of claim 6 comprising wireless telephone circuitry that is operatively coupled to the plurality of antennas through the beam selection structure.

8. The wireless portable device of claim 6 wherein at least one of the plurality of antennas is located in a movable flip portion of the wireless portable device and wherein the beam selection structure is operative to select the antenna in the movable flip portion as a primary antenna when the wireless portable device is determined to be in an open position.

9. The wireless portable device of claim 7 wherein the beam selection circuit is operative to change a beam angle of the portable device with respect to a nominal device position.

10. The wireless portable device of claim 7 wherein the satellite network position signal processing circuit further includes at least one of signal strength measurement circuitry and signal quality measurement circuitry.

11. The wireless portable device of claim 10 wherein the control circuit controls the beam selection structure to acquire device positioning signals from the positioning satellites using the antenna that is determined to receive device positioning signals from a higher a number of positioning satellites.

12. A method of acquiring satellite positioning information for a portable device comprising:

determining a number of positioning satellites detected using a first antenna of a plurality of antennas that have different beam angles;

switching to a second antenna having a different beam angle from the first antenna;

determining a number of positioning satellites detected using the second antenna; and acquiring device positioning signals from the positioning satellites using the antenna that is determined to receive device positioning signals from a higher number of positioning satellites.

13. The method of claim 12 including storing a detected number of satellites in memory and comparing the stored number of detected satellites to a threshold number of satellites that are desired to be detected.

14. The method of claim 12 including selecting the antenna in a movable flip portion of the wireless portable device as a primary antenna when wireless portable device is determined to be in an open position.

15. The method of claim 12 including determining which antenna is to be used to acquire device positioning signals based also on at least one of a signal strength and a signal quality of received satellite positioning signals.

16. A method of acquiring satellite positioning information for a portable device comprising:

detecting a device position location request;

determining a number of positioning satellites detected using a first antenna of a plurality of antennas that have different beam angles;

storing information corresponding to the number of satellites detected using the first antenna;

switching to a second antenna having a different beam angle from the first antenna;

determining a number of satellites detected using a first antenna of a plurality of antennas that have different beam angles;

storing information corresponding to the number of satellites detected using the second antenna; and acquiring device positioning signals from the positioning satellites using the antenna that is determined to receive positioning signals from a higher number of positioning satellites.

17. The method of claim 16 including storing a detected number of satellites in memory and comparing the stored number of detected satellites to a threshold number of satellites that are desired to be detected.

18. The method of claim 17 including selecting the antenna in the movable flip portion as a primary antenna when wireless portable device is determined to be in an open position.

19. The method of claim 16 including determining which antenna is to be used to acquire device position location information based also on at least one of a signal strength and a signal quality of received satellite position signals.

20. A wireless portable device comprising:

a plurality of built-in antennas operative to receive signals from a plurality of positioning satellites and wherein at least two of the plurality of built in antennas have different beam angles with respect to each other;

a beam selection structure operatively coupled to the plurality of antennas;

a satellite network positioning signal processing circuit, operatively coupled to the beam selection structure to selectively receive information from the plurality of built in antennas;

a control circuit, operatively coupled to the beam selection structure, and operative to control switching between each of the plurality of built in antennas based on at least a number of positioning satellites detected by the satellite network positioning signal processing circuit; and wherein at least one of the plurality of built in antennas is located in a movable flip portion of the wireless portable device and wherein the beam selection structure is operative to select the built in antenna in the movable flip portion as a primary antenna when the wireless portable device is determined to be in an open position.

* * * * *